UNITED STATES PATENT OFFICE.

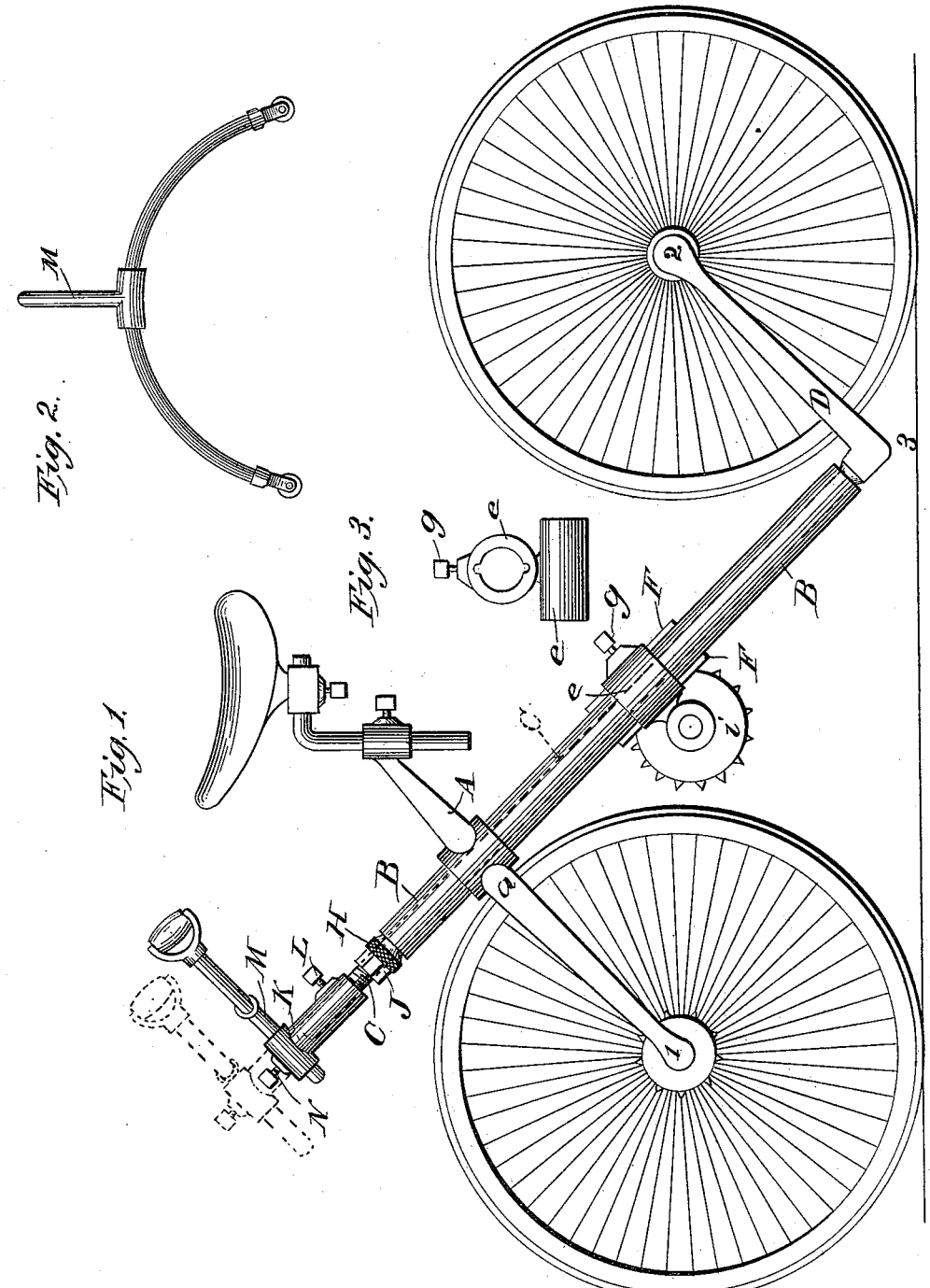

EDWARD MANSFIELD STROUD, OF PHILADELPHIA, PENNSYLVANIA.

VELOCIPEDE.

SPECIFICATION forming part of Letters Patent No. 451,080, dated April 28, 1891.

Application filed August 11, 1890. Serial No. 361,760. (No model.)

*To all whom it may concern:*

Be it known that I, EDWARD MANSFIELD STROUD, a citizen of the United States of America, residing at Philadelphia, (Germantown,) in the county of Philadelphia and State of Pennsylvania, have invented certain new and useful Improvements in the Frame, the Steering Device, and the Device for Taking Up the Slack in the Driving-Chain of Safety Bicycles, of which the following is a specification, reference being had therein to the accompanying drawings.

The object of this invention is to provide for a frame having greater lightness and simplicity than is contained in any Safety bicycle as strongly built at present used, on account of the fewer number of pieces required; to make use of the backbone for the double purpose of backbone and steering-head, thereby obviating the necessity of a separate steering-head; to overcome sensitiveness in steering by having the steering centers so arranged in their relation to the steering-wheel that the combined weight of the rider and the machine upon the lower bearing of the steering-shaft $c$ tends to keep both wheels pointed upon the same line, so that the forward course of the bicycle cannot be altered except by a voluntary movement of the handles; to cause the back wheel, which is the steering-wheel, to caster in such a manner as to maintain a straightforward course except when either handle is pressed downward on the side to which the rider desires to go; to provide for a lengthening backward and raising upward of the handles to accommodate them to the size of the rider; to lessen side sliding or skidding while rapidly turning a corner by having the rear wheel course in the direction which, in a machine having it fixed, it would otherwise skid; to have the steering centers so adjusted to the rest of the machine as to have the machine in running describe a series of larger curves than does the ordinary Safety, thereby making a steadier-running bicycle; to have the driving-gear attached to the front wheel, making it pull the rest of the machine after it instead of pushing it, as in the ordinary Safety bicycle; to provide for a means of tightening the chain by unscrewing the bolt-nut $g$ and sliding the piece $e$ down the backbone.

Figure 1 is a side elevation partly in section; Fig. 2, a top plan of steering-bar; Fig. 3, a detail showing section of tightening device.

The front forks $a$ and seat-support A, being one continuous piece, are welded to the backbone B. The steering-shaft $c$, being one continuous piece with the rear forks D, is thrust up through the tubular backbone B, and its protruding end being threaded is held firmly by set-nut J, which nut is also used to fasten down bearing-adjuster H. Over the still farther protruding end of the steering-shaft $c$ is telescoped the socket K, (fastened with the nut-bolt L,) through which runs the lug M of the handle-bar (fastened with the nut-bolt N.) About the middle of the backbone B, and welded or screwed to it above and below, are two steel flanges F to prevent side turning and to maintain the right relation to the rest of the machine of the piece $e$. This piece $e$ is composed of tubular steel and telescopes over the backbone, being grooved inside above and below to conform to the flanges F. It is continued on its under side, as in Figs. 1 and 3, into a tubular box to be fitted with the bearings for the shaft carrying the sprocket-wheel $i$ and the pedal-cranks. Unscrewing the bolt-nut $g$ allows the piece $e$ with its attachments to slide down the backbone, as in the dotted lines, thus taking up the slack in the chain.

Fig. 2 represents the handle-bars with the lug M, which lug, when inserted in a hole in the socket K and loosened by the nut-bolt N, moves the handle slantingly forward and back. Socket K telescopes over steering-shaft $c$, and when liberated by the nut-bolt L slides slantingly up and down. The handle-bars, when screwed down by nut-bolts N and L, become continuously rigid with the steering-shaft $c$ and rear forks D, so that pressure upon either handle inclines the rear wheel to the side on which pressure is made, thus steering the bicycle. When the pressure is released, the weight of the rider and backbone applied at the elbow 3, as suspended below the pivotal hub-centers 1 and 2, causes the wheel to return to the straightforward position.

I claim—

1. The combination of the steering-shaft $c$ and the forks D with the backbone B, and the piece composing the forks $a$ and the seat-support A, whereby a straightforward course is maintained by the weight of the rider and backbone, (assisted by the forward motion of the machine while running,) compelling the wheel to follow and caster, as specified.

2. The combination of the socket K with the steering-shaft c and the lug M, for the purpose of adjusting the handles, substantially as specified.

3. The device for tightening the chain, consisting of the telescoping piece e, sliding over the backbone B, the flanges F, and locking bolt-nut g, substantially as specified.

In testimony whereof I affix my signature in presence of two witnesses.

EDWARD MANSFIELD STROUD.

Witnesses:
 LOUIS CALDWELL BUTLER,
 JOHN K. MURPHY.